United States Patent [19]

Ueno et al.

[11] Patent Number: 5,086,109
[45] Date of Patent: Feb. 4, 1992

[54] POLYPROPYLENE RESIN COMPOSITION

[75] Inventors: Kohhei Ueno; Tomohiko Akagawa, both of Sakai; Saburo Hinenoya, Izumisano; Toshio Morimoto, Sakai, all of Japan

[73] Assignee: Ube Industries, Ltd., Yamaguchi, Japan

[21] Appl. No.: 618,899

[22] Filed: Nov. 28, 1990

[30] Foreign Application Priority Data

Dec. 1, 1989 [JP] Japan ................................ 1-310568

[51] Int. Cl.$^5$ .................................................. C08R 3/40
[52] U.S. Cl. .................................. 524/496; 524/413; 524/423; 524/424; 524/426; 524/436; 524/437; 524/449; 524/451; 524/494; 525/98
[58] Field of Search ............... 525/98; 524/496, 494, 524/451, 449, 426, 424, 423, 437, 436, 413

[56] References Cited

U.S. PATENT DOCUMENTS

| | | | |
|---|---|---|---|
| 3,299,174 | 1/1967 | Kuhre et al. | 525/98 |
| 4,480,065 | 10/1984 | Kawai et al. | 524/423 |
| 4,552,689 | 11/1985 | Yui et al. | 524/449 |
| 4,603,153 | 7/1986 | Sobajima jet al. | 524/449 |
| 4,737,536 | 4/1988 | Kawase et al. | 525/98 |
| 4,987,173 | 1/1991 | Nomura et al. | 524/449 |

FOREIGN PATENT DOCUMENTS

| | | |
|---|---|---|
| 53-64257 | 6/1978 | Japan . |
| 57-51735 | 3/1982 | Japan . |
| 58-206644 | 12/1983 | Japan . |
| 58-215446 | 12/1983 | Japan . |
| 59-223745 | 12/1984 | Japan . |
| 60-166339 | 8/1985 | Japan . |
| 61-28547 | 2/1986 | Japan . |
| 61-28548 | 2/1986 | Japan . |
| 61-34047 | 2/1986 | Japan . |
| 61-34048 | 2/1986 | Japan . |

*Primary Examiner*—Veronica P. Hoke
*Attorney, Agent, or Firm*—Finnegan, Henderson, Farabow, Garrett & Dunner

[57] ABSTRACT

A polypropylene resin composition comprising:
(A) 50 to 90% by weight of a crystalline ethylene-propylene block copolymer;
(B) 5 to 20% by weight of a hydrogenated block copolymer composed of both end blocks of an aromatic vinyl compound and an intermediate block of a conjugated diene polymer;
(C) 0 to 15% by weight of an amorphous ethylene-propylene copolymer;
(D) 0 to 5% by weight of a high density polyethylene having a melt flow index of 1 to 10; and
(E) 5 to 30% by weight of a particulate or flaky inorganic filler having an average particle diameter of 3 μm or less, wherein the blending ratio (B)/(C) (by weight) of the hydrogenated block copolymer component (B) to the amorphous ethylene-propylene copolymer component (C) is 100/0 to 20/80.

7 Claims, No Drawings

POLYPROPYLENE RESIN COMPOSITION

BACKGROUND OF THE INVENTION

1. Field of the Invention

The present invention relates to a polypropylene resin composition. More specifically, it relates to a polypropylene resin composition composed mainly of a crystalline ethylene-propylene copolymer and capable of providing a molded article having a particularly good balance between the thermal deformation resistance and the impact resistance thereof and having superior mechanical characteristics and coating properties, and further, having a superior moldability. This polypropylene resin composition can be utilized in the fields of, for example, large-sized components for automobiles and components for domestic appliances.

2. Description of the Related Art

A crystalline polypropylene is now utilized for various molded articles which must have physical properties such as a strong rigidity and a high thermal deformation resistance, but this material has unsatisfactory low temperature characteristics and a poor impact resistance and coating property, because it is a high crystalline polymer; this can cause a problem in that it cannot be utilized for applications where a strong rigidity, high thermal deformation resistance and impact resistance, and a good coating property are simultaneously required. To improve the impact resistance and coating resistance of the crystalline polypropylene, the use of a polypropylene comprising a crystalline ethylene-propylene block copolymer as the crystalline polypropylene and having an amorphous ethylene-propylene copolymer blended therewith, and a polypropylene composition comprising a crystalline ethylene-propylene block copolymer and having an amorphous ethylene-propylene copolymer and various kinds of polyethylene blended therewith has been proposed.

These proposed conventional polypropylene compositions have the disadvantage of causing a lowering of the above-described properties, such as the rigidity and thermal deformation resistance, inherent to the crystalline ethylene-propylene block copolymer.

To alleviate the disadvantage of the proposed conventional polypropylene compositions, Japanese Unexamined Patent Publication (Kokai) No. 53-64257 describes an invention entitled "Impact-Resistant Resin Composition." This publication discloses a resin composition having an improved low temperature impact resistance, which composition comprises a crystalline ethylene-propylene block copolymer, an amorphous ethylene-α-olefin copolymer, and talc. Further, this publication provides descriptions and working examples to the effect that this composition shows a marked improvement in the low temperature impact strength, rigidity and coating property thereof, compared to the conventional crystalline crystalline-propylene block copolymer. Even in the above-described composition, however, a satisfactory balance between the rigidity and the impact strength is not obtained, and the coating property is also unsatisfactory. Accordingly, a molded article prepared from the above-described composition can be used for applications in which the appearance is not important, but is unsuitable for use in applications where not only the various mechanical properties but also the appearance is regarded as important, such as when used in various parts for automobiles, particularly instrument panels and bumpers.

Compositions comprising an olefin resin and a hydrogenated block copolymer, each used in the present invention, have been proposed in, for example, Japanese Unexamined Patent Publication (Kokai) Nos. 58-206644, 58-215446, 59-223745, 60-166339, 61-28547, 61-28548, 61-34047, 61-34048, but these compositions contain large amounts of a hydrogenated block copolymer and softening agent, and thus the rigidity thereof is low. Therefore, the technical concept of the above-described proposals is entirely different from that of the present invention, i.e., a technical concept such that a hydrogenated block copolymer and an inorganic filler are incorporated in a crystalline ethylene-propylene block copolymer to thereby provide a molded article having a better balance between the thermal deformation resistance and the impact resistance, and a superior coating property and appearance.

Further, Japanese Unexamined Patent Publication (Kokai) No. 57-51735 proposes a composition comprising a crystalline ethylene-propylene block copolymer, a hydrogenated block copolymer and an amorphous ethylene-propylene copolymer, as used in the present invention, but this composition does not contain an inorganic filler, and accordingly, the thermal deformation resistance and rigidity thereof are low, and thus the object of the present invention cannot be attained.

Therefore, the molding of the conventional polypropylene resin compositions does not provide a molded article having a good balance between the thermal deformation resistance and the impact strength, a superior mechanical property, and a superior coating property.

SUMMARY OF THE INVENTION

Accordingly, the objects of the present invention are to eliminate the above-mentioned disadvantages of the prior art and to provide a polypropylene resin composition capable of providing a molded article having a good balance between the thermal deformation resistance and the impact strength, a superior mechanical property, and a superior coating property.

Other objects and advantages of the present invention will be apparent from the following description.

In accordance with the present invention, there is provided a polypropylene resin composition comprising:

(A) 50 to 90% by weight of a crystalline ethylene-propylene block copolymer having an ethylene content of 4 to 10% by weight, an insolubility, in boiling n-heptane, of a polypropylene component of 97% by weight or more, an inherent viscosity, in decalin at 135° C.; of p-xylene soluble at room temperature of 3 to 7, a melt flow index of 3 to 30, and a flexural modulus of 15,000 kg/cm$^2$ or more;

(B) 5 to 20% by weight of a hydrogenated block copolymer composed of both end blocks of an aromatic vinyl compound and an intermediate block of a conjugated diene polymer, the content of both end blocks being 10 to 40% by weight of the copolymer, 10% or less of both end blocks and 90% or more of the intermediate block being in a hydrogenated state;

(C) 0 to 15% by weight of an amorphous ethylene-propylene copolymer having an inherent viscosity, in decalin at 135° C., of 1.8 to 3.5 and a Mooney viscosity $ML_{1+4}$ (100° C.) of 40 to 100;

(D) 0 to 5% by weight of a high density polyethylene having a melt flow index of 1 to 10; and (E) 5 to 30% by weight of a particulate or flaky inorganic filler having an average particle diameter of 3 μm or less, wherein the blending ratio (B)/(C) (by weight) of the hydrogenated block copolymer component (B) to the amorphous ethylene-propylene copolymer component (C) is 100/0 to 20/80.

DESCRIPTION OF THE PREFERRED EMBODIMENTS

According to the present invention, the above-mentioned objects can be attained by a composition comprising a blend, in specific proportions, of a specific crystalline ethylene-propylene block copolymer, a hydrogenated block copolymer, an amorphous ethylene-propylene copolymer, a high density polyethylene, and a particulate or flaky inorganic filler.

Component (A)

The component (A) used in the present invention has an ethylene content of 4 to 10% by weight, preferably 5 to 9% by weight, an insolubility, in boiling n-heptane, of a polypropylene component of 97% by weight or more, preferably 97.5% by weight or more, an inherent viscosity (in decalin at 135° C.) of a component soluble in p-xylene at room temperature (comprising an amorphous ethylene-propylene copolymer and a low-molecular weight polymer) of 3 to 7, preferably 4 to 7, a melt flow index of 3 to 30, preferably 4 to 20, and a flexural modulus of 15,000 kg/cm² or more, preferably 15,800 kg/cm² or more. In the present specification, the expression "a polypropylene component insoluble in a boiling n-heptane" is intended to mean a component, insoluble in a boiling n-heptane, of a crystalline polypropylene (often referred to as "matrix") used in a block copolymer reaction. When the above-mentioned component, insoluble in a boiling n-heptane, of the polypropylene component is less than 97% by weight, the thermal deformation temperature of a molded article prepared from the polypropylene composition is lowered. When the above-mentioned inherent viscosity, in decalin at 135° C., of a component, soluble in p-xylene at room temperature, is less than 3, the Izod impact strength at −30° C. of the molded article is lowered, and when the viscosity is more than 7, the percentage residual coating in the cross-cut test of the molded article, described later, becomes lower than 100%. When the above-mentioned melt flow index is less than 3, the appearance of the molded article and the moldability of the polypropylene composition become poor, and when the melt flow index is more 30, the impact resistance is lowered. None of the above-mentioned polypropylene resin compositions is usable as a material for a molded article required to have a combination of a superior appearance and a strong rigidity, high thermal deformation resistance and low temperature impact resistance, and a superior coating property.

The content of the above-mentioned crystalline ethylene-propylene block copolymer in the composition is 50 to 90% by weight, preferably 60 to 90% by weight. When the above-mentioned content is less than 50% by weight, the moldability becomes poor, and when the content is more than 90% by weight, the Izod impact strength at −30° C. is lowered. Two or more crystalline ethylene-propylene block copolymers may be used, as long as the total amount thereof is within the above-mentioned amount range. Further, use can be made of a crystalline ethylene-propylene block copolymer modified by a grating process through the addition of an unsaturated organic acid or derivative thereof, as long as the use thereof does not deviate from the object of the present invention.

Component (B)

The base polymer of the hydrogenated block copolymer used in the present invention is a block copolymer comprising an intermediate block of a conjugated diene polymer (90 to 60% by weight, preferably 85 to 65% by weight), and is provided at both ends thereof with a block of an aromatic vinyl compound polymer (10 to 40% by weight, preferably 15 to 35% by weight). Examples of the above-mentioned aromatic vinyl compound constituting both end blocks include styrene polymers such as stylene, α-methylstyrene and chlorostyrene, and the molecular weight thereof is preferably 5,000 to 14,000, more preferably 7,000 to 13,000 in terms of number average molecular weight. The particularly preferable aromatic vinyl compound is styrene. Examples of the conjugated diene constituting the intermediate block include butadiene, isoprene and chloroprene, and the molecular weight thereof is preferably 10,000 to 300,000, more preferably 20,000 to 200,000. The conjugated diene is particularly preferably butadiene. When the content of the block copolymer at both ends is less than 10% by weight, the hardness and strength are too low, and if the content is more than 40% by weight, the impact resistance of the molded article is poor. Therefore, the block content at both ends is preferably 15 to 25% by weight.

The hydrogenated block copolymer used in the present invention can be prepared by hydrogenating the above-mentioned block copolymer. In the hydrogenation, the percentage of the hydrogenation of the block at both ends is 10% or less, and the percentage of the hydrogenation of the intermediate block is 90% or more. The percentage of the hydrogenation of the intermediate block is preferably 95% or more; when the percentage of the hydrogenation is 90% or less, the weather resistance is lowered. When the intermediate block is polybutadiene, the hydrogenation product thereof has an ethylene-butylene copolymer structure, and when the intermediate block is polyisoprene, the hydrogenation product thereof has an ethylene-propylene copolymer structure.

The hydrogenated block copolymer used in the present invention is commercially available under the trade name of Kraton G (manufactured by Shell Kagaku K.K.).

The content of the above-mentioned hydrogenated block copolymer in the composition is 5 to 20% by weight, preferably 5 to 15% by weight. When the above-mentioned content is less than 5% by weight, the impact strength is lowered, and when the content is 20% by weight or more, the rigidity is lowered.

Component (C)

The amorphous ethylene-propylene copolymer used in the polypropylene resin composition of the present invention has an inherent viscosity, in decalin at 135° C., of 1.8 to 3.5 (preferably 1.8 to 3.0) and a Mooney viscosity $ML_{1+4}$ (100° C.) of 40 to 100 (preferably 50 to 90). When the above-mentioned inherent viscosity is less than 8, a phase separation occurs between the crystalline ethylene-propylene copolymer, the amorphous ethylene-propylene copolymer and the high density polyethylene, and accordingly, the rigidity and low temperature impact resistance of the molded article are lowered, and at the same time, the appearance of the molded article is poor. On the other hand, when the inherent viscosity is more than 3.5, a homogeneous dispersion by kneading becomes difficult, and thus a required improvement of the coating property of the molded article cannot be attained. The amorphous ethylene-propylene copolymer may be a diene-containing terpolymer, as long as the use thereof does not deviate from the object of the present invention. The preferable ethylene content of the amorphous ethylene-propylene copolymer is 50 to 90% by weight.

The content of the above-described ethylene-propylene copolymer in the entire composition is 0 to 15% by weight, preferably 0 to 10% by weight, more preferably more than 0 to 10% by weight. When the above-described content is 15% by weight or more, the rigidity is too low. Further, in the whole composition, the blending ratio (i.e., (B)/(C) by weight) of the above-described component (C) to the component (B) is 100/0 to 20/80, preferably 100/0 to 40/60. When the blending ratio is outside the above-described range, the thermal deformation resistance is too low and the coating property is poor.

Component (D)

The high density polyethylene used in the polypropylene composition of the present invention has a melt flow index of 1 to 10 (preferably 2 to 8). When the above-mentioned melt flow index is less than 1, it becomes difficult to homogeneously disperse the high density polyethylene in the composition, and thus the appearance of the molded article and the moldability of the polypropylene composition are poor. On the other hand, when the melt flow index is more than 10, it becomes difficult to homogeneously disperse the amorphous ethylene-propylene copolymer and high density polyethylene composition in the composition, and thus the rigidity and low temperature impact resistance of the molded article are lowered, and at the same time, the appearance of the molded article is poor.

In the polypropylene composition of the present invention, the polyethylene must be a high density polyethylene having a density of 0.95 g/cm$^3$ or more, to provide a molded article having an excellent balance between the rigidity and the impact resistance and a superior coating property and appearance. When the density of the polyethylene is less than 0.95/cm$^3$, a required improvement of the coating property and appearance of the molded article cannot be obtained, and further, the low temperature impact resistance becomes poor.

The content of the above-mentioned high density polyethylene in the whole composition is 0 to 5% by weight, preferably more than 0 to 5% by weight; if the content is more than 5, the appearance of the molded article is poor.

Component (E)

Examples of the particulate or flaky inorganic filler include talc, mica, clay, calcium carbonate, magnesium carbonate, calcium sulfate, barium sulfate, aluminum hydroxide, magnesium hydroxide, diatomaceous earth, titanium oxide, carbon black, and glass powder; and talc, calcium carbonate, barium sulfate, and mica are preferred.

The inorganic filler used in the present invention may be subjected to various surface treatments.

For example, the surface treatment may be a chemical or physical surface treatment, for example, with a silane coupling agent, higher fatty acid, metal salt of a fatty acid, unsaturated organic acid or derivative thereof (e.g., maleic anhydride and acrylic acid), organic titanate, resin acid, and polyethylene glycol, and these may be used alone or in a combination of two or more thereof as long as such a combination does not deviate from the object of the present invention.

The component (E) is blended in an amount is 5 to 30% by weight, preferably 5 to 25% by weight. When the amount blended is smaller than 5% by weight, the dimensional stability and rigidity is poor, and when the amount blended is more than 30% by weight, the impact resistance and flawing resistance are lowered.

Blending

The polypropylene composition of the present invention can be easily prepared by kneading the individual components in a headed state in various kneaders, such as a Banbury mixer, heated roll, kneader, high-speed biaxial extruder, biaxial extruder and monoaxial extruder, particularly preferably, a Banbury mixer or high-speed biaxial extruder.

To further improve the properties of the article molded from the polypropylene composition of the present invention, the following additives may be added during or after the mixing of the individual components of the composition; for example, antioxidants such as 2,6-di-tert-butylphenol, 2,6-di-tert-butyl-4-ethylphenol, 2,6-di-tert-butyl-4-n-butylphenol, 2,6-di-tert-butyl-α-dimethylamino-p-cresol, 6-(4-hydroxy-3,5-tert-butylanilino)-2,4-bisoctyl-thio-1,3,5-triazine, n-octadecyl-3-(4'-hydroxy-3',5'-di-tert-butylphenyl) propionate, 2-di-tert-butyl-4-methylphenol (BHT), tris-(2-methyl-4-hydroxy-5-tert-butylphenyl)butane, tetrakis-[methylene-3-(3',5'-di-tert-butyl-4'-hydroxyphenyl)propionate]methane, 1,3,5-trimethyl-2,4,6-tris(3,5-di-tert-butyl-4-hydroxybenzyl)benzene and dilauryl thiodipropionate; ultraviolet absorbers such as 2-hydroxy-4-n-octoxybenzophenone, 2-hydroxy-4-octadecyloxybenzophenone, 4-dodecyloxy-2-hydroxybenzophenone, nickel-bis-(o-ethyl-3,5-di-tert-butyl-4-hydroxybenzyl) phosphonate, 2-hydroxy-4-n-octoxybenzophenone, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole and bis(2,6-dimethyl-4-piperidyl) sebacate; flame retardants such as antimony trioxide, tricresyl phosphate, halogenated alkyltriazine, decabromodiphenyl ether and chlorinated polyethylene; pigments such as carbon black and titanium oxide; coating improvers such as magnesium benzoate; plasticizers such as process oil; lubricants such as a metal salt of a fatty acid; and antistatic agents such as polyoxyethylene alkyl ether.

The polypropylene resin polymer of the present invention is prepared by blending and combining, in predetermined proportions, a specific crystalline ethylene-propylene block copolymer with a hydrogenated block copolymer and a particulate or flaky inorganic filler, and further, optionally an amorphous ethylene-propylene copolymer and/or a high density polyethylene. The molded article prepared from the composition of the present invention has an excellent balance between the thermal deformation resistance and the impact resistance, and a superior mechanical property and coating property, can be used in the fields of large-sized components for automobiles and components for domestic appliances, and is particularly suitable for instrument panels, bumpers and fenders.

EXAMPLES

The present invention will now be described in more detail by, but is not limited to, the following Examples.

Examples 1 to 6 and Comparative Examples 1 to 6

The blend of individual components shown in Table 1 was further blended with 0.2% by weight of a phenolic antioxidant, kneaded, and pelletized at 230° C. by a 2FCM extruder, molded into a test piece for evaluation by an injection molding machine, and evaluated by the following test methods. The results are shown in Table 1.

(1) Thermal deformation temperature

Determined according to ASTM D 648 (bending stress: 18.5 kg/cm$^2$).

(2) Izod impact resistance

Determined according to ASTM D 256.

(3) Brittle temperature

Determined according to ASTM D 746.

(4) Coating property (percentage residual coating (%) in cross-cut test)

A test piece was coated with a two-component acryl-chlorinated polypropylene primer (manufactured by Cashew Co., Ltd.) to a thickness of 10 μm, and then coated with a two-component acryl-urethane top coat (manufactured by Cashew Co., Ltd.) to a thickness of 20 μm, dried at 80° C. for 30 min, and allowed to stand at room temperature for 40 hr to thereby prepare a coated product. Then 100 squares, each measuring 1 mm by 1 mm, were cut in the coating of the coated product by a multicross-cutter, and a rapid peeling of the coating at an angle of 45°, by attaching and then removing a cellophane adhesive tape, was repeated twice to determine the proportion (%) of squares from which the coating was not peeled.

(5) Appearance of molded article:

The surface of the test piece was observed with the naked eye.

| Component (A) Crystalline ethylene-propylene block copolymer | | | | |
|---|---|---|---|---|
| | (A-1) | (A-2) | (A-3) | (A-4) |
| Ethylene content (wt. %) | 7.0 | 7.3 | 7.3 | 7.3 |
| Boiling n-heptane insoluble | 97.5 | 97.8 | 93.5 | 93.2 |
| p-xylene soluble [η] | 4.0 | 4.2 | 4.2 | 3.9 |
| MF | 4 | 9 | 4 | 9 |
| Flexural modulus | 16,000 | 16,500 | 14,000 | 14,200 |

Component (B)
(B-1): Kraton G1650 manufactured by Shell Kagaku K.K.
(B-2): Kraton G1657 manufactured by Shell Kagaku K.K.

Component (C)
Amorphous ethylene-propylene copolymer
Ethylene content: 77% by weight
$ML_{1+4}$ (100° C.): 70

Component (D)
High density polyethylene
Density: 0.95 g/cm$^3$
MFR: 5 g/10 min

Component (E)
(E-1): talc
Average particle diameter: 2.5 μm
(E-2): calcium carbonate
Average particle diameter: 0.14 μm
(E-3): glass fiber
Length: 6 mm
Fiber diameter: 10 μm As apparent from the results shown in Table 1, all of the compositions of the present invention prepared in Examples 1 to 6 have a high quality, i.e., have an excellent balance between the thermal deformation resistance and the impact resistance and superior mechanical properties, and further, a good appearance and superior coating property. In contrast, the compositions of Comparative Examples 1 to 6 have problems in at least one of the mechanical property, coating property, and appearance.

TABLE 1

| Composition and physical properties | | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|
| Crystalline ethylene-propylene (A-1) | wt. % | 70 | 67 | — | 69 | 65 | 70 | — | 70 | 80 | — | 50 | 55 |
| Block copolymer (A-2) | | — | — | 77 | — | — | — | — | — | — | — | — | — |
| Hydrogenated block (B-1) | wt. % | 10 | 10 | 8 | — | 5 | 5 | 10 | — | 10 | — | 15 | 25 |
| Copolymer (B-1) | | — | — | — | 8 | — | — | — | — | — | — | — | — |
| Amorphous ethylene-propylene copolymer (C) | wt. % | — | — | — | — | — | 5 | — | 10 | — | — | — | — |
| Glass fiber (E-3) | wt. % | — | — | — | — | — | — | — | — | 10 | — | — | — |
| High density polyethylene (D) | wt. % | — | 3 | — | — | — | — | — | — | — | — | — | — |
| Crystalline ethylene-propylene (A-3) | wt. % | — | 3 | — | — | — | — | 70 | — | — | — | — | — |
| Block copolymer (A-4) | | — | 3 | — | — | — | — | — | — | — | 69 | — | — |
| Talc (E-1) | wt. % | 20 | 20 | 15 | 23 | 5 | 20 | 2 | 20 | — | 23 | 35 | 20 |
| Calcium carbonate (E-2) | wt. % | — | — | — | — | 20 | — | — | — | — | — | — | — |
| Thermal deformation temp. | °C. | 78 | 76 | 79 | 77 | 75 | 75 | 72 | 71 | 95 | 73 | 73 | 55 |
| Izod (23° C.) | kg.cm/cm | 25 | 30 | 20 | 23 | 22 | 23 | 25 | 21 | 16 | 21 | 12 | >40 |
| Brittle temp. | °C. | −7 | −10 | −5 | −6 | −3 | −5 | −6 | −4 | −10 | −4 | +6 | <−15 |
| Coating property | % | 100 | 100 | 100 | 100 | 100 | 100 | 100 | 98 | 45 | 100 | 73 | 100 |
| Appearance of molded article | | o | o | o | o | o | o | x | x | x | x | x | x |

Note:
o: superior appearance having gloss without flow marks
x: poor appearance having no gloss and flow marks

We claim:

1. A polypropylene resin composition comprising:
   (A) 50 to 90% by weight of a crystalline ethylene-propylene block copolymer having an ethylene content of 4 to 10% by weight, an insolubility, in boiling n-heptane, of a polypropylene component of 97% by weight or more, an inherent viscosity in decalin at 135° C., of p-xylene soluble at room temperature of 3 to 7, a melt flow index of 3 to 30, and a flexural modulus of 15,000 kg/cm² or more;
   (B) 5 to 20% by weight of a hydrogenated block copolymer composed of both end blocks of an aromatic vinyl compound and an intermediate block of a conjugated diene polymer, the content of both end blocks being 10 to 40% by weight of the copolymer, 10% or less of both end blocks and 90% or more of the intermediate block being in a hydrogenated state;
   (C) 0 to 15% by weight of an amorphous ethylene propylene copolymer having an inherent viscosity, in decalin at 135° C., of 1.8 to 3.5 and a Mooney viscosity $ML_{1+4}$ (100° C.) of 40 to 100;
   (D) 0 to 5% by weight of a high density polyethylene having a melt flow index of 1 to 10; and
   (E) 5 to 30% by weight of a particulate or flaky inorganic filler having an average particle diameter of 3 μm or less, wherein the blending ratio (B)/(C) (by weight) of the hydrogenated block copolymer component (B) to the amorphous ethylene-propylene copolymer component (C) is 100/0 to 20/80.

2. A polypropylene resin composition as claimed in claim 1, wherein the composition comprises 60 to 90% by weight of the component (A), 5 to 15% by weight of the component (B), more than 0 to 10% by weight of the component (C), more than 0 to 5% by weight of the component (D), and 5 to 25% by weight of the component (E).

3. A polypropylene resin composition as claimed in claim 1, wherein the component (A) is a crystalline ethylene-propylene block copolymer having the ethylene content of 5 to 9% by weight, the insolubility of a polypropylene component of 97.5% by weight or more, the inherent viscosity of 4 to 7, the melt flow index of 4 to 20, and the flexural modulus of 15,800 kg/cm² or more.

4. A polypropylene resin composition as claimed in claim 1, wherein the component (B) is the hydrogenated product of a block copolymer composed of at least one aromatic vinyl compound selected from the group consisting of styrene, α-methylstyrene, and chlorostyrene and at least one conjugated diene selected from the group consisting of butadiene, isoprene, and chloroprene.

5. A polypropylene resin composition as claimed in claim 1, wherein the component (C) is an amorphous ethylene-propylene copolymer or an amorphous ethylene-propylene-diene terpolymer.

6. A polypropylene resin composition as claimed in claim 1, wherein the component (D) is a high density polyethylene having a density of 0.95 g/cm³ or more.

7. A polypropylene resin composition as claimed in claim 1, wherein the component (E) is at least one member selected from the group consisting of talc, mica, clay, calcium carbonate, magnesium carbonate, calcium sulfate, barium sulfate, aluminum hydroxide, magnesium hydroxide, diatomaceous earth, titanium oxide, carbon black, and glass powder.

* * * * *